Dec. 22, 1942.     E. J. PRATT     2,305,633
FILTERING DEVICE
Filed May 17, 1939
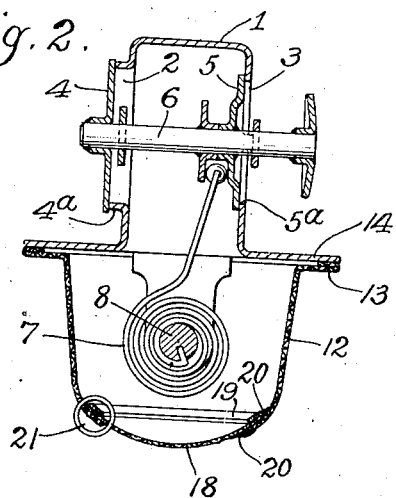
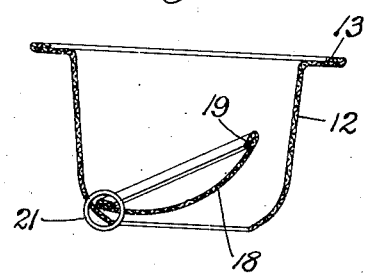
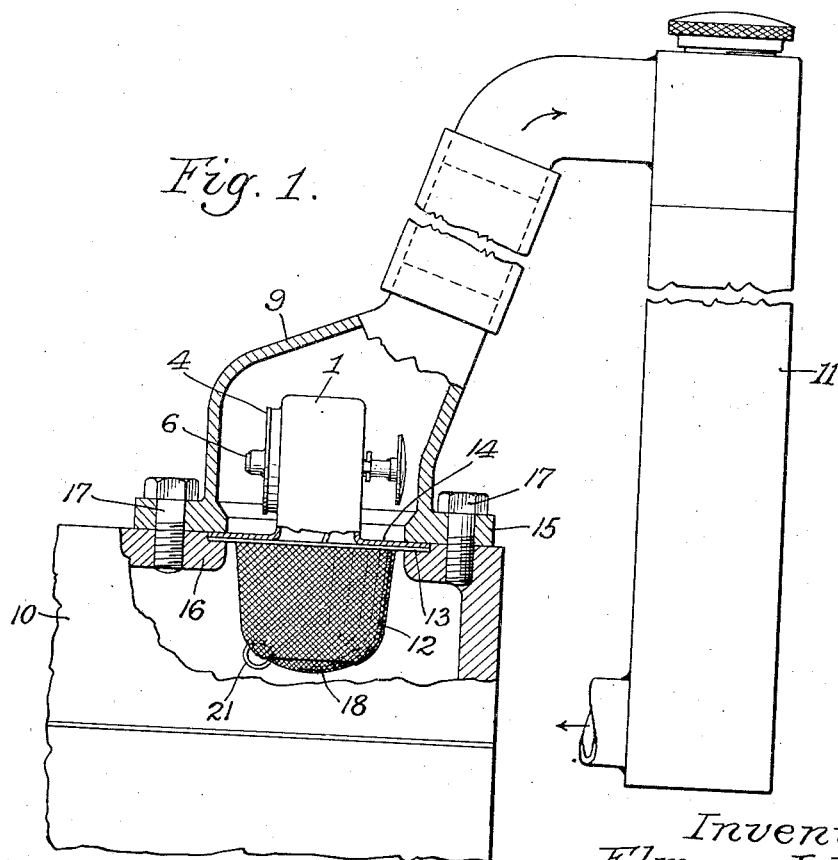
Inventor.
Elmer J. Pratt.
by Parker & Carter
Attorneys.

Patented Dec. 22, 1942

2,305,633

UNITED STATES PATENT OFFICE 2,305,633

FILTERING DEVICE

Elmer J. Pratt, Chicago, Ill.

Application May 17, 1939, Serial No. 274,250

9 Claims. (Cl. 210—166)

This invention relates to filtering devices particularly adapted to filter fluid passing through a valve and has for its object to provide a new and improved device of this description.

It often happens that in fluids passing through valves which control the passage of the fluids, there are foreign solid particles and these particles may lodge in the valves so as to prevent their proper action. These foreign particles of solid material, for example, may cause the valves to be held open when they should be closed. The invention has as a further object to provide a filtering device for filtering out particles of solid material that may be in the fluid passing to the valve, such filtering device being provided with means for opening a passage through the filtering device when the fluid passing to the valve reaches a predetermined temperature. The invention has as a further object to provide a filtering device of this description, having a section which opens when the fluid passing to the valve reaches a predetermined temperature, there being means for maintaining a connection between said section and the rest of the filtering device when the section opens.

The invention has further objects which are more particularly pointed out in the accompanying description.

Referring now to the drawing, Fig. 1 is a view showing one form of the device embodying the invention as applied to a particular valve construction;

Fig. 2 is a sectional view through the valve and the filtering device; and

Fig. 3 is an enlarged sectional view of the filtering device.

Like numerals refer to like parts throughout the several figures. The present invention is an improvement on my invention described and claimed in my Patent Number 2,289,068, issued July 7, 1942.

Referring now to the drawing, where I have shown for purposes of illustration one use of the device, there is provided a valve casing 1 with valve ports 2 and 3 therein, and which are controlled by valves 4 and 5, closing on seats 4a and 5a. These valves are connected together by a member 6. There is a thermostat 7 which has one end connected to a fixed part 8 and the other end connected to the member 6, so that when the temperature of the fluid reaches a predetermined point, the thermostat will act to move the valves 4 and 5 to open the ports 2 and 3 and permit the fluid to pass through the valve. In this particular construction the valve is located in the circulatory system of an internal combustion engine, being located in the connection 9 leading from the engine jacket 10 to the radiator 11. In such a construction, the valve, for example, is held closed when the engine is started up, so that the cooling fluid does not pass to the radiator, but remains in the engine jacket and therefore heats up quickly so as to bring the temperature of the engine cylinders up to the proper efficient temperature for operation. After this proper temperature is reached, the thermostat acts to open the valve so that the cooling fluid may then circulate through the radiator and be cooled, thus preventing the engine from being injured by overheating.

It often happens that there are solid particles in the fluid passing through the valve and if one or more of these solid particles is caught between either of the valves 4 or 5 and the valve seats 4a and 5a, the valves will be held open so that the cooling fluid will circulate through the radiator when the engine is first started up and will not speedily bring it up to the proper temperature. In order to prevent this, I provide a filter 12 arranged in the path of the fluid passing to the valve so that this fluid will be filtered, thereby preventing solid particles from reaching the valve and interfering with its proper action. This filter may of course be made of any suitable material, but is preferably made of wire screening of a comparatively fine mesh, such, for example, as twenty to seventy mesh.

This filter is formed with a flange 13 preferably of the same material as the filter and in the particular illustration shown, the valve casing 1 is provided with a flange 14 and both the valve casing and the filter are held in position by being clamped between the flange 15 on the connection 9 and the opposed part 16 on the engine, the parts being held in position by the fastening devices 17. In this construction the filter is preferably made tubular in shape, being larger at the end nearest the valve. By making the end farthest from the valve smaller, a section 18 of the filter may be removed, this being done before the end is made smaller in circumference. In this event, the section 18 will have a greater diameter than the opening in the end of the filter, so that the edge or periphery may be bent back upon itself, as shown at 19. This strengthens the edge or periphery of the section, the section still remaining of sufficient size to entirely close the opening in the filter. This bending back of the edge of the section 18 is simply a matter of convenience and the filter itself may be made tubular, or any other shape, and the section 18 may also be made of any shape.

The section 18 is held in position by some fusible material 20, which melts at a predetermined temperature, that is which melts before the temperature reaches a point where any part of the apparatus in connection with which the device is used would become too hot or would become injured. Such a material to melt at various temperatures is well known and can be made to melt at temperatures varying in range. When the device is used in the circulatory system of an internal combustion engine, this fusible material should melt at approximately two hundred and twelve degrees Fahrenheit. Such material, for example, may be made up of thirty percent lead, twenty percent tin and fifty percent bismuth. A material, for example, which will melt at one hundred and fifty degrees Fahrenheit may consist of ten and eight-tenths percent cadmium, fourteen and two-tenths percent tin, twenty-four and nine-tenths percent lead and fifty and one-tenth percent bismuth. This material may be made to melt at various temperatures in between one hundred and fifty degrees Fahrenheit and two hundred and twelve degrees Fahrenheight by varying the proportion of the material, as is well known in the art.

There may be various reasons for bringing about this objectionable heat condition. When the device, for example, is used in connection with the circulatory system of an internal combustion engine, the filter may become clogged up by means of solid particles so as to retard or stop the fluid passing through the valve and thus stop this fluid from being cooled by the radiator. In this event the cooling fluid in the engine jacket would become so hot as to injure the engine. By means of my present device, this is avoided, for when the temperature reaches a predetermined point, which will be sufficiently below the danger point, the fusible material which connects the section 18 of the filter with the body of the filter, will melt and section 18 will open up the filter and permit the free unobstructed flow of the fluid through the valve and through the radiator. It will thus be seen that this device therefore automatically acts to prevent injury to any of the parts due to the heat. For example, when the fusible material melts, if the filter section 18 should be free to be disconnected from the body of the filter, it might become entangled with the thermostat or the valve. Furthermore, if it should get down into the engine jacket, it might interfere with the operation of the pump.

In order to prevent the section 18 from becoming displaced or lost, I provide some simple means for connecting one edge of it to the body of the filter, so that when the material holding the section 18 in place melts, the fluid current will move it to its open position as shown, for example, in Fig. 3, and it will remain connected with the main body of the filter so that there is no danger of its being displaced or lost. In the construction shown this connection is made by means of a ring 21 which passes through the edge of the section 18 and through the edge of the body of the filter adjacent to this edge, as clearly illustrated in Fig. 3. When the section 18 becomes loosened, due to the melting of the material, the pressure of the liquid in the system moves the section 18 so that the liquid can pass freely through the opening in the filter 12. Under these conditions the ring 21 acts as a hinge, located at one edge of the filter section 18, about which it moves when the fusible material releases it. It will be seen, however, that the filter section has two holding devices for holding it in its filtering position, that one of them is released responsive to temperature, the other being responsive to the pressure of the liquid in the passageway when the first mentioned means is released to permit the filter section to be moved to provide a freely open passageway through the filter body. When the filter becomes clogged, therefore, all that is necessary is to remove the filter and clean it and again attach the section 18 to it by means of the fusible material.

I claim:

1. A filtering device for filtering fluids flowing through a passageway, comprising a filter body extending across the passageway and having an opening therethrough, a filter section extending across said opening and fastened in position by fusible material, and a connecting device connecting one edge of said filter section with the body of the filter, which permits the filter section to move to provide an opening through the filter body, but to be maintained connected to the filter body.

2. A filtering device for filtering fluids flowing through a passageway, comprising a filter body extending across the passageway and having an opening therethrough, a filter section extending across said opening and fastened in position by fusible material, and a connecting device connecting one edge of said filter section with the body of the filter, which permits the filter section to move to provide an opening through the filter body, but to be maintained connected to the filter body, said connecting device consisting of a ring passing through the filter body and the filter section.

3. A filtering device for filtering fluids flowing through a passageway, comprising a filter body extending across the passageway and having an opening therethrough, a filter section extending across said opening and fastened in position by fusible material which melts at a predetermined temperature so as to be moved to provide an unobstructed opening through the filter body, and a connecting device connecting one edge of said filter section with the body of the filter, which permits the filter section to move to provide an opening through the filter body, but to be maintained connected to the filter body.

4. A filtering device for filtering fluids flowing through a passageway, comprising a tubular filter body extending across the passageway and provided with openings at both ends, means for holding said filter body in position, a filter section extending across one of the openings through said filter body, so as to close said opening, said filter section held in position across said opening by fusible material which melts at a predetermined temperature, and a connecting device for connecting one edge of said filter section with the filter body.

5. A filtering device for filtering fluids flowing through a passageway, comprising a tubular filter body extending across the passageway and provided with openings at both ends, means for holding said filter body in position, a filter section extending across one of the openings through said filter body, so as to close said opening, said filter section held in position across said opening by fusible material which melts at a predetermined temperature, and a connecting device for connecting one edge of said filter section with the filter body, said tubular filter body being smaller at the end to which the filter section is connected.

6. A filtering device for filtering fluids flowing through a passageway, comprising a filter body extending across the passageway and having an opening therethrough, a filter section extending across said opening, hinged at one edge to the filter body and fusible material connecting the other edge of said filter section with the body portion of the filter.

7. A filtering device for filtering fluids flowing through a passageway, comprising a filter body extending across the passageway and having an opening therethrough, a filter section extending across said opening, and two holding means for holding said filter section in its filtering position, one of said holding means acting in response to temperature to release the filter section to provide an unobstructed opening through the filter body.

8. A device of the kind described, for use in connection with a passageway, comprising a filter body extending across the passageway, a valve on the downstream side of said filter body, a thermostat for controlling said valve, said filter body being provided with a movable section hinged thereto and additional means for holding said filter section in its filtering position, said means responsive to temperature to permit the filter section to be moved to an inoperative position.

9. A filtering device for filtering fluid flowing through a passageway, comprising a substantially tubular filter body extending across said passageway, a thermostat in said tubular body, a valve controlled by said thermostat, said filter body having an opening therethrough, a filter section covering said opening, and two holding devices for holding said filter section in filtering position, one being released when the temperature reaches a predetermined point, the other being responsive to the pressure of the liquid in the passageway when the first-mentioned means is released, to permit the filter section to be moved to provide a freely open passageway through the filter body.

ELMER J. PRATT.